(12) United States Patent
Ramcke

(10) Patent No.: US 7,351,363 B2
(45) Date of Patent: Apr. 1, 2008

(54) PRESS FOR HARD FOAM PLATES

(75) Inventor: Carsten Ramcke, Gescher (DE)

(73) Assignee: Hennecke GmbH, Leverkusen (DE)

( * ) Notice: Subject to any disclaimer, the term of this patent is extended or adjusted under 35 U.S.C. 154(b) by 483 days.

(21) Appl. No.: 10/493,183

(22) PCT Filed: Oct. 11, 2002

(86) PCT No.: PCT/EP02/11403

§ 371 (c)(1),
(2), (4) Date: Apr. 20, 2004

(87) PCT Pub. No.: WO03/035352

PCT Pub. Date: May 1, 2003

(65) Prior Publication Data

US 2004/0244611 A1 Dec. 9, 2004

(30) Foreign Application Priority Data

Oct. 23, 2001 (DE) .................. 101 52 134

(51) Int. Cl.
B29C 44/02 (2006.01)
B29C 44/06 (2006.01)
B29C 44/34 (2006.01)

(52) U.S. Cl. .................. 264/45.2; 100/214; 264/46.4; 264/46.5; 264/51; 264/314; 425/4 R; 425/405.1; 425/406

(58) Field of Classification Search ................ 100/211, 100/214; 264/45.2, 51, 314, 46.4, 46.5; 425/4 R, 425/406, 450.1, 405.1

See application file for complete search history.

(56) References Cited

U.S. PATENT DOCUMENTS

| 3,161,911 | A |   | 12/1964 | Mathews .......................... 18/5 |
| 4,519,763 | A | * | 5/1985  | Matsuda et al. ......... 425/192 R |
| 5,124,095 | A | * | 6/1992  | Gianni et al. ............... 264/45.5 |
| 5,922,265 | A | * | 7/1999  | Parekh ........................ 264/257 |
| 6,113,382 | A |   | 9/2000  | McNally ..................... 425/589 |

FOREIGN PATENT DOCUMENTS

DE 28 10 007 9/1979

* cited by examiner

Primary Examiner—Allan R. Kuhns
(74) Attorney, Agent, or Firm—Lucas & Mercanti, LLP

(57) ABSTRACT

A press for rigid foam sheets with continuous adjustment of the spacing between the two press plates (1,3), in particular for sandwich panels with an upper and lower outer layer and, located therebetween, a core of rigid polyurethane foam. The lower press plate (3) is here moved into a preselected position corresponding to the panel thickness to be foamed by means of synchronously rotating threaded lifting spindles (4), assisted by weight-compensating cylinders (5). Short-stroke cylinders (6) are provided between the heads of the threaded lifting spindles (4) and the lower press plate (3). Said short-stroke cylinders have the function of dissipating the moulding force which has arisen due to foaming by moving the press plate (3) a very small stroke downwards. It is also possible, instead of the short-stroke cylinders (6), to install an air cushion system, which has a stroke of approx. 1 mm, between the press plate and the heating plate. This stroke is sufficient to dissipate the foaming pressure.

9 Claims, 1 Drawing Sheet

Press open

Press closed

Press open

Cross-section

Side view

PRESS FOR HARD FOAM PLATES

The invention relates to a press or also closing device for rigid foam panels, in particular for sandwich panels comprising a rigid polyurethane foam core with two outer layers of a flexible or also rigid material such as aluminium, steel or plastics. The machine here has a system with which the spacing between the press plates may be adjusted continuously in preprogrammable manner and the moulding pressure arising after foaming may be dissipated by a short-stroke cylinder or an inflatable cushion.

Sandwich panels comprising a rigid polyurethane foam core with outer layers are often produced on presses which are often used in other branches or industry as true presses. This means that the stroke of these machines is limited by the workpiece or the press mould. However, when producing rigid foam panels, the spacing between the press plates must be fixed in advance so that the foam pressure which arises can rise up against a defined plane which is precisely fixed. In the case of mass-produced elements, for example in the production of panels for refrigerated shipping containers, the mould is designed such that it simultaneously acts as a limit stop for the mobile press plate. This method is very economic for such production processes because these panels are always of the same thickness or the production run is so long that a change-over to another panel thickness and thus the use of a different mould occurs only rarely.

Another method is known in which hydraulic cylinders move the lower press table against limit stops which can be interchanged depending on the desired panel thickness. In this case, however, the hydraulic system must apply a moulding force which is substantially higher than that which the foaming pressure can generate in order to avoid unexpected opening of the press. In this system too, there is a risk that, due to human error, the spacers may be forgotten at several points or even just one point, which will inevitably result not only in a defective product but also in particular in machine damage.

In order to enable rapid adjustment of press plate spacing and thus of sandwich panel thickness, a machine has been developed in which the lower press table is moved by hydraulic cylinders against limit stops which are brought into position by means of synchronously driven threaded spindles. In this case too, a hydraulic system is necessary in which the moving cylinders must apply the entire moulding force.

A manufacturer in the USA has developed a machine in which the press plate is moved into position exclusively by means of threaded spindles. In this manner, continuous adjustment of stroke height and thus sandwich panel thickness is possible. However, this machine has the disadvantage that, due to the foaming pressure, the self-locking threaded spindles require a very high opening moment, in particular because spindles with upstream worm gearing have an efficiency of no more than approx. 20%.

In the most recent developments, the attempt is made to actuate the hydraulic lifting cylinders individually in such a manner that the press plate can be positioned exactly without any axiliary means such as limit stops or the like. However, these efforts have hitherto come to nothing due to the considerable technical complexity involved and the sandwich panel manufacturers' requirements for very tight thickness tolerances.

The object of the invention is to provide a press in particular for the production of polyurethane sandwich panels with which any thickness of sandwich panel may be produced without long change-over times and by means of which tight thickness tolerances are ensured even over a large area. The intention was furthermore to ensure that the energy liberated by the foaming pressure need not unnecessarily be introduced by the hydraulic lifting system alone, but rather that the foaming pressure be dissipated with low energy input by a self-locking closing system.

The invention relates to a press for rigid foam panels containing
  a frame,
  a press plate (1) arranged stationarily in the frame and a press plate (3) arranged movably in the frame,
  at least one threaded spindle (4), which is arranged between the mobile press plate (3) and the frame,
  characterised in that the press furthermore contains at least one hydraulically movable lifting cylinder (5), which is arranged between the mobile press plate (3) and the frame,
  together with at least one hydraulically movable short-stroke cylinder (6), which is arranged between the mobile press plate (3) and the threaded spindle (4) and the movement of which is limited by limit stops.

The invention furthermore relates to a press for rigid foam panels containing
  a frame,
  a press plate (1) arranged stationarily in the frame and a press plate (3) arranged movably in the frame,
  at least one threaded spindle (4), which is arranged between the mobile press plate (3) and the frame,
  characterised in that the press furthermore contains at least one hydraulically movable lifting cylinder (5), which is arranged between the mobile press plate (3) and the frame,
  and that the mobile press plate (3) comprises a first and a second press plate and, arranged therebetween, a pneumatically or hydraulically fillable cushion, wherein the first and the second press plate are movable towards one another and wherein the movement thereof is limited by internal limit stops.

The invention also relates to a process for the production of rigid polyurethane foam panels, in which a press according to claim 1 is used and in which
  a) the short-stroke cylinder (6) is hydraulically extended to its limit stop and the threaded spindle (4) and the lifting cylinder (5) are extended in the direction of the stationarily arranged press plate (1), such that the mobile press plate (3) moves towards the stationarily arranged press plate (1), wherein movement of the threaded spindle (4) and of the lifting cylinder (5) is stopped when a predetermined spacing between the stationarily arranged press plate (1) and the mobile press plate (3) is obtained, and then
  b) liquid polyurethane reaction mixture is introduced into a mould (9) and the mould (9) is arranged between the stationarily arranged press plate (1) and the mobile press plate (3) and the liquid polyurethane reaction mixture is allowed to foam and cure, and then
  c) the short-stroke cylinder (6) is retracted again and then
  d) the threaded spindle (4) and the lifting cylinder (5) are moved back again.

The invention also relates to a process for the production of rigid polyurethane foam panels, in which a press according to claim 2 is used and in which
  a) the cushion between the first and the second press plate of the mobile press plate (3) are filled hydraulically or pneumatically, such that the first and the second press plate move apart to the inner limit stops and the threaded spindle (4) and the lifting cylinder (5) are extended in the direction of the stationarily arranged press plate (1), such that the mobile press plate (3) moves towards the stationarily arranged press plate (1), wherein the movement of the threaded spindle (4) and of the lifting cylinder (5) is stopped when a predetermined spacing between the stationarily arranged press plate (1) and the mobile press plate (3) is obtained, and then b) liquid polyurethane reaction mixture is introduced into a mould (9) and the mould (9) is arranged between the stationarily arranged press plate (1) and the mobile press plate (3) and the liquid polyurethane reaction mixture is allowed to foam and cure, and then c) the cushion hydraulically or pneumatically filled in step a) is at least partially emptied again and then d) the threaded spindle (4) and the lifting cylinder (5) are moved back again.

A stroke of approx. 1 mm is here sufficient to dissipate the foaming pressure in step c).

The predetermined spacing between the stationarily arranged press plate and the mobile press plate is here determined by the desired thickness of the rigid polyurethane foam panels.

The process is preferably performed such that 50 to 99% of the power required to move the mobile press plate is applied by the lifting cylinder and 1 to 50% of the required power is applied by the threaded spindles.

The invention in particular relates to a press for rigid foam panels with continuous adjustment of the spacing between the two press plates, in particular for sandwich panels with an upper and lower outer layer and, located therebetween, a core of rigid polyurethane foam, characterised in that, the mobile press plate is raised and lowered by threaded spindles and hydraulically actuated cylinders are provided between the threaded spindles and the press plate, which cylinders relieve the pressure prevailing in the space between the upper and lower press plate after the foaming operation, so overcoming the need for the elevated release force for the self-locking threaded spindles which would otherwise be required, or the mobile press plate is raised and lowered by threaded spindles and an air cushion with a stroke limited by internal limit stops is installed in the mobile press plate and the pressure prevailing in the space between the upper and lower press plate is relieved in this manner.

The press and the process for the production of the rigid polyurethane foam panels is illustrated in greater detail below by way of example with reference to the Figures.

In the drawings

Figure 1:
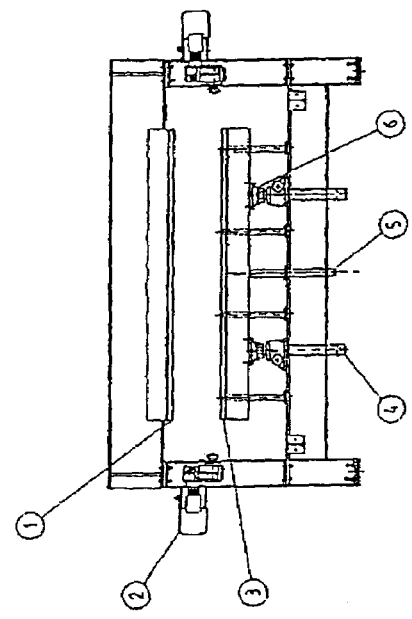
FIG. 1 is a schematic representation of the press according to claim 1, in which the press is closed.
Figure 2:
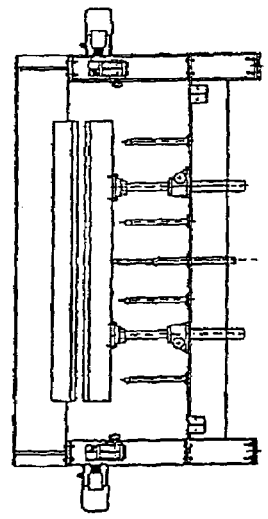
FIG. 2 is a schematic representation of the press according to claim 1, in which the press is open.
Figure 3:
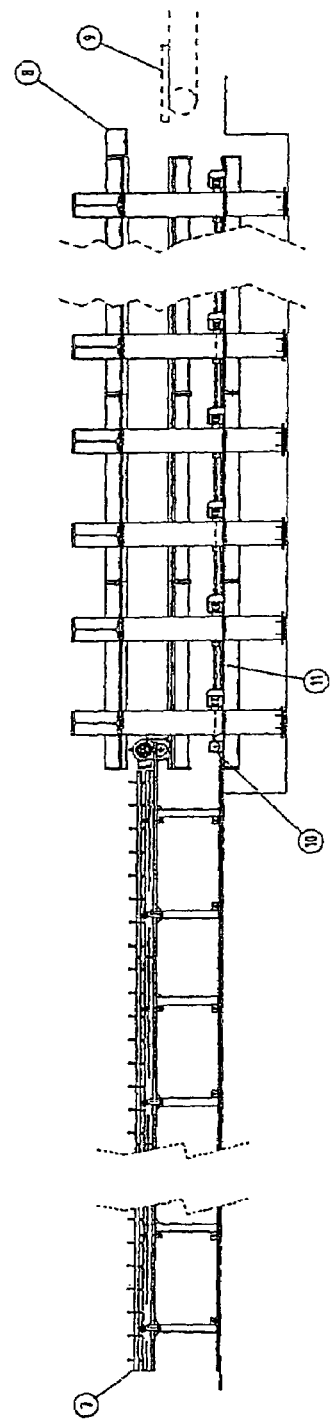
FIG. 3 is a side view of the press according to claim 1, in which the press is open.

The invention is based on the following concept, on which the following explanations relating to FIGS. 1 to 3 are based. The relatively light-weight lower (or also upper) press table (3) (i.e. the mobile press plate) is moved into the desired position by means of threaded spindles (4). Thanks to the use of threaded spindles (4), movement of the mobile press plate (3) is continuous. The threaded spindles (4) are self-locking and provided with a low drive power as they are assisted by hydraulic lifting cylinders (5). The threaded spindles (4) are interconnected by means of a torsionally rigid shaft system (11) and a bevel gear system (10) and are thus synchronised. Precise positioning of the press plate (3) may thus be achieved, even over very long panel lengths. Short-stroke cylinders (6) are installed between the heads of the threaded spindles (4) and the press plate (3), which short-stroke cylinders are extended during the foaming process and the subsequent curing of the sandwich panels. Once the panels have cured, the short-stroke cylinders (6) are opened first so that the moulding force which has arisen due to the foaming pressure can be dissipated and the spindles (4) can be opened easily and with little energy input without requiring a large release moment. The same advantage is achieved if, instead of the short-stroke cylinders (6), a mobile press plate (3) is used which comprises a first and a second press plate and, arranged therebetween, a hydraulically or pneumatically fillable cushion. Then, once the rigid polyurethane foam panels have cured, the cushion is first at least partially emptied in order to dissipate the moulding force which has arisen due to the foaming pressure. The foaming mould (9), also known as a cassette, has no influence on the panel thickness to be obtained—the same mould (9) is used for any panel thickness. While the lower outer layer is introduced into the press with the mould (9) (cassette), the upper outer layer is introduced by means of the carriage (7) and laid and fixed by suction on the upper press plate (i.e. the stationarily arranged press plate) (1). The high-torque drive (2) also serves, after a coupling operation, to draw the mould (9) into the press, the mould being filled with polyurethane foam by the injection head (8).

Any panel thicknesses within a range determined by the design of the machine may be produced without requiring major conversion and change-over operations or adjustments. The accuracy of panel thickness is very high; synchronisation of the threaded spindles is ensured by a torsionally rigid shaft system. There is no risk of human operating errors, nor of consequent damage to the machine, so minimising material wastage and increasing machine productivity.

The invention claimed is:

1. A press for the production of a rigid foam sheet comprising:
   a) a frame,
   b) a stationary press plate arranged on the frame,
   c) a movable press plate assembly arranged on the frame comprising
      (1) a first movable press plate the movement of which is limited by internal limit stops,
      (2) a second movable press plate the movement of which is limited by internal stops, and
      (3) a pneumatically or hydraulically fillable cushion arranged between the first movable press plate and the second movable press plate wherein the first movable press plate and the second movable press plate are movable towards one another,
   d) at least one threaded spindle arranged between the movable press plate assembly and the frame, and
   e) at least one hydraulically movable lifting cylinder arranged between the movable press plate assembly and the frame.

2. A process for the production of a rigid polyurethane foam panel with the press of claim 1 comprising:
   1) filling the cushion between the first and second movable press plates in a manner such that the first and second movable press plates move apart to their inner stops,
   2) extending the threaded spindle and the lifting cylinder in the direction of the stationary press plate in a manner such that the movable press plate assembly moves toward the stationary press plate until a predetermined space between the stationary press plate and the movable press plate assembly has been obtained, 3) introducing a liquid polyurethane reaction mixture into a mold,
4) arranging the mold in the space between the stationary press plate and the movable press plate assembly,
5) allowing the reaction mixture to foam and cure,
6) at least partially emptying the filled cushion, and
7) returning the threaded spindle and lifting cylinder to an unextended position.

3. The process of claim 2 in which the liquid polyurethane reaction mixture is introduced into the mold by means of an injection head while the mold is being arranged in the space between the stationary press plate and the movable press plate assembly.

4. The process of claim 2 in which from 50 to 99% of any power required to move the movable press plate assembly is applied by the lifting cylinder.

5. The process of claim 2 in which a layer of material is introduced onto each surface of the mold before the liquid polyurethane reaction mixture is introduced into the mold in a manner such that the layers will form outer layers on the foamed and cured polyurethane.

6. A process for the production of a rigid polyurethane foam panel with a press for the production of a rigid foam sheet comprising:
   a) a frame,
   b) a stationary press plate arranged on the frame,
   c) a movable press plate arranged on the frame,
   d) at least one threaded spindle arranged between the movable press plate and the frame,
   e) at least one hydraulically movable lifting cylinder arranged between the movable press plate and the frame,
   f) at least one hydraulically movable short-stroke cylinder the movement of which is limited by stops that is arranged between the movable press plate and the threaded spindle comprising:
   1) hydraulically extending the short-stroke cylinder to its limit stop,
   2) extending the threaded spindle and lifting cylinder in the direction of the stationary press plate in a manner such that the movable press plate moves toward the stationary press plate to establish a predetermined space,
   3) introducing a liquid polyurethane reaction mixture into a mold,
   4) arranging the mold in the space between the stationary press plate and the movable press plate,
   5) allowing the polyurethane reaction mixture to foam and cure,
   6) retracting the short-stroke cylinder, and
   7) returning the threaded spindle and lifting cylinder to an unextended position.

7. The process of claim 6 in which the liquid polyurethane reaction mixture is introduced into the mold by means of an injection head while the mold is being arranged in the space between the stationary press plate and the movable press plate.

8. The process of claim 6 in which from 50 to 99% of any power required to move the movable press plate is applied by the lifting cylinder.

9. The process of claim 6 in which a layer of material is introduced onto each surface of the mold before the liquid polyurethane reaction mixture is introduced into the mold in a manner such that the layers will form outer layers on the foamed and cured polyurethane.

* * * * *